(No Model.)
W. J. CASSADAY.
DEVICE FOR CONVERTING MOTION.
No. 348,107. Patented Aug. 24, 1886.
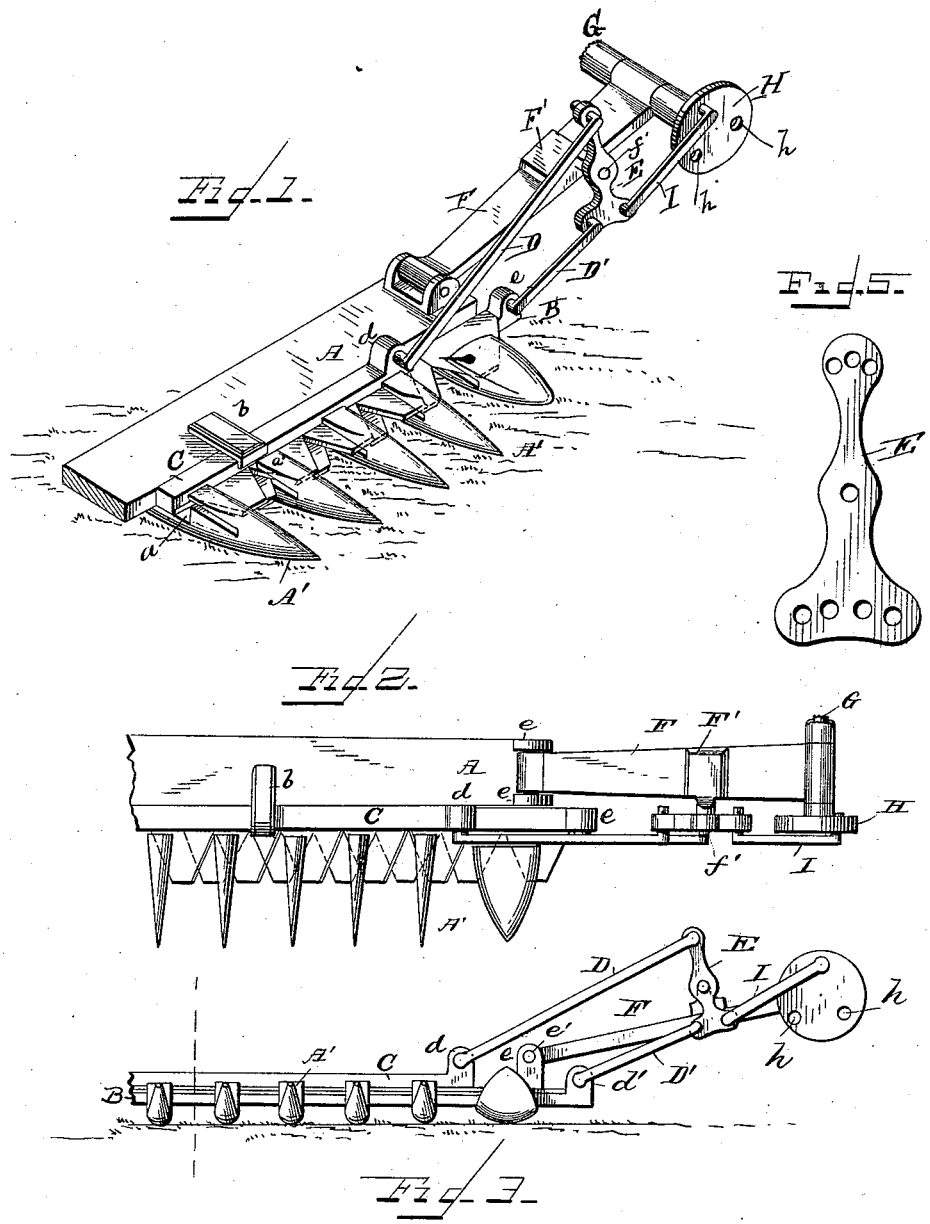

UNITED STATES PATENT OFFICE.

WILLIAM J. CASSADAY, OF FINCHFORD, IOWA.

DEVICE FOR CONVERTING MOTION.

SPECIFICATION forming part of Letters Patent No. 348,107, dated August 24, 1886.

Application filed January 14, 1886. Serial No. 188,604. (No model.)

*To all whom it may concern:*

Be it known that I, WILLIAM J. CASSADAY, a citizen of the United States of America, residing at Finchford, in the county of Black Hawk and State of Iowa, have invented certain new and useful Improvements in Devices for Converting Motion; and I do hereby declare the following to be a full, clear, and exact description of the invention, such as will enable others skilled in the art to which it appertains to make and use the same, reference being had to the accompanying drawings, and to letters or figures of reference marked thereon which form a part of this specification.

My invention relates to certain new and useful improvements in means for operating the knives of reciprocating cutters; and my invention consists in the special construction and combination of the parts, as will be hereinafter fully set forth, and specifically pointed out in the claims.

In the accompanying drawings, which illustrate my invention, Figure 1 is a perspective view of my improvement. Fig. 2 is a plan view. Fig. 3 is a front view. Fig. 4 is a detail sectional view of the cutting mechanism, and Fig. 5 is a detail view of a modification of the pivoted lever.

A refers to the front beam of a mowing-machine or other grass or grain cutting implement, which is attached to the main frame in the usual manner, and has rigidly attached thereto projecting pointed fingers A', which fingers are recessed, as shown at $a$, within which recess the lower cutter-bar, B, reciprocates. The upper cutter-bar, C, reciprocates on a line with the beam A, and the fingers A' are provided with portions $a'$, which lie over the upper set of knives and extend rearwardly adjacent to the reciprocating bar. A forward movement of the upper reciprocating bar, C, is prevented by the employment of angle-bars $b$, which are securely attached at intervals to the upper edge of the bar A.

Each of the reciprocating bars, B and C, which carry the knives are provided at their ends with upwardly-projecting ears $d e$, through which passes a pivot-bolt, $e'$, for connecting thereto pivotally a support-arm or connecting means, F. The opposite end of this supporting-bar F is provided with an eye, through which passes the driving-shaft G, which driving-shaft is connected to the mowing-machine in the usual manner. The driving-shaft G carries at its outer end a wrist-wheel, H, which is provided with three or more perforations, $h$, which are located at different distances from the center of said wrist-wheel, and into one of these perforations is secured one of the bent ends of the connecting-bar I, the other end being attached to a perforation in the lower enlarged end of the pivoted lever E.

By changing the position of the bar I and placing it in different perforations in the wrist-wheel the oscillations of the lever E and the reciprocation of the cutter-bars may be varied without disturbing or adjusting other portions of the mechanism. This change can also be made by placing the bars D D' in the different perforations in the pivoted lever E, when the same is constructed as shown in Fig. 5 of the drawings.

The bar F has rigidly attached thereto a plate, F', which is provided with an outwardly-projecting arm, $f'$, upon which the lever E is pivotally secured.

By the construction hereinbefore described the length of the reciprocations of the cutter-bars can be varied, and it will be noted that while one of the cutter-bars moves in one direction the other moves in the opposite direction, thus comparatively increasing the speed of the cutters without varying the speed of the machine.

I am aware that it is not broadly new to connect reciprocating cutters to a lever and operate said lever from a wrist-wheel, and I therefore do not claim such construction, broadly; but

What I claim as new, and desire to secure by Letters Patent, is—

1. In a device for converting motion or changing a rotary motion into a reciprocating motion, the combination of a wrist-wheel rigidly attached to a rotary shaft and provided with openings at different distances from the center of said wrist-wheel for attaching thereto a connecting-bar, said connecting-bar being pivotally secured near one end of an oscillating lever, said oscillating lever having attached thereto at opposite ends bars which are connected to independent reciprocating bars, substantially as shown, and for the purpose set forth.

2. In a device for converting motion, constructed substantially as described, the bar A, pivotally connected to the operating parts of the driving mechanism and connecting-bar F thereof, being provided with an upwardly-projecting portion, F', which carries a pivoted lever, the bars D and D', pivotally connected to said lever and to reciprocating bars, the bar I, connecting the lever to a wrist-wheel, the parts being combined and organized substantially as shown, and for the purpose set forth.

In testimony whereof I affix my signature in presence of two witnesses.

WILLIAM J. CASSADAY.

Witnesses:
S. H. PACKARD,
L. AUFEAR KNAPP.